United States Patent [19]
Fork

[11] 3,721,051
[45] March 20, 1973

[54] BOTTOMLESS SUB-ASSEMBLY FOR PRODUCING AN UNDERFLOOR ELECTRICAL CABLE TRENCH
[75] Inventor: Frank W. Fork, Allison Park, Pa.
[73] Assignee: H. H. Robertson Company, Pittsburgh, Pa.
[22] Filed: July 1, 1971
[21] Appl. No.: 158,769

Related U.S. Application Data
[63] Continuation-in-part of Ser. No. 71,494, Sept. 11, 1970, abandoned.

[52] U.S. Cl. ................... 52/173, 52/221, 174/49
[51] Int. Cl. ..................... E04f 17/08, E04f 19/08
[58] Field of Search .....52/220, 221, 173; 174/48, 49

[56] References Cited
UNITED STATES PATENTS

| 3,131,512 | 5/1964 | MacLeod, Jr. | 52/221 |
| 3,334,457 | 8/1967 | Hudson et al. | 52/221 |
| 3,237,356 | 3/1966 | Fork | 52/220 |
| 3,368,311 | 2/1968 | Fork | 52/127 |
| 3,435,568 | 4/1969 | Hoseason et al. | 52/221 |
| 3,453,791 | 7/1969 | Fork | 52/221 |
| 3,420,018 | 1/1969 | Fork | 52/221 |
| 3,566,566 | 3/1971 | Janic | 52/221 |

FOREIGN PATENTS OR APPLICATIONS

| 676,751 | 12/1963 | Canada | 174/49 |
| 659,866 | 3/1963 | Canada | 52/220 |

Primary Examiner—Alfred C. Perham
Attorney—Harry B. Keck et al.

[57] ABSTRACT

A bottomless sub-assembly installed over metal cellular flooring and enclosing an upper surface portion of the flooring. The upper surface portion cooperates with the sub-assembly to create a structure which may be described as an underfloor electrical cable trench. The upper surface portion may be exposed to view by removing a cover plate of the sub-assembly. Vertically adjustable conduit means positioned beneath the cover plate, provides a separate enclosed passageway. A unique arrangement for distributing multi-conductor telephone cables is described.

16 Claims, 24 Drawing Figures

PATENTED MAR 20 1973
3,721,051
SHEET 1 OF 5
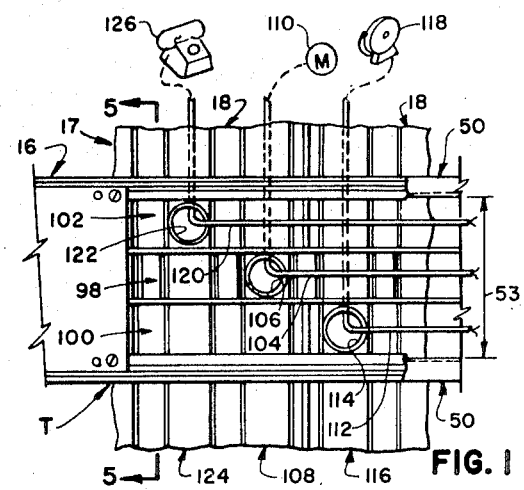
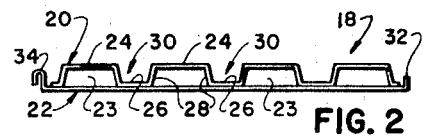
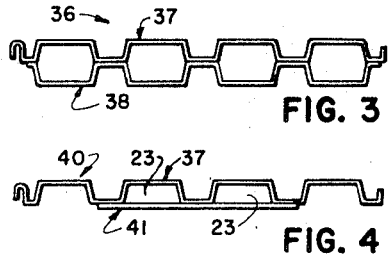
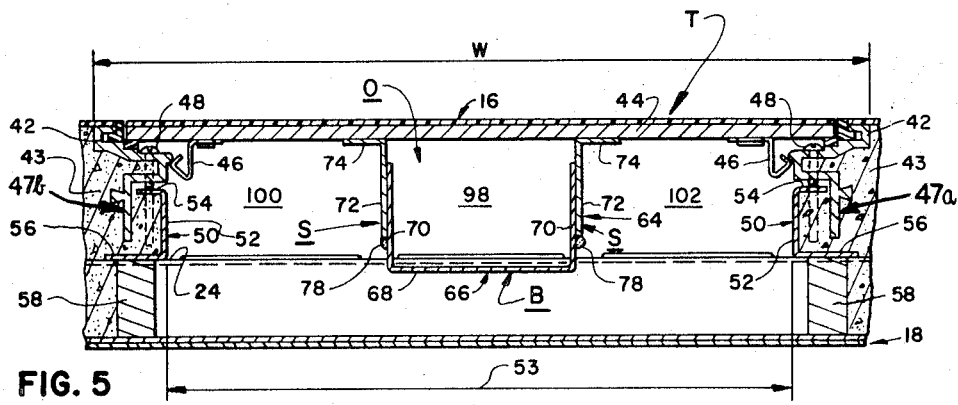
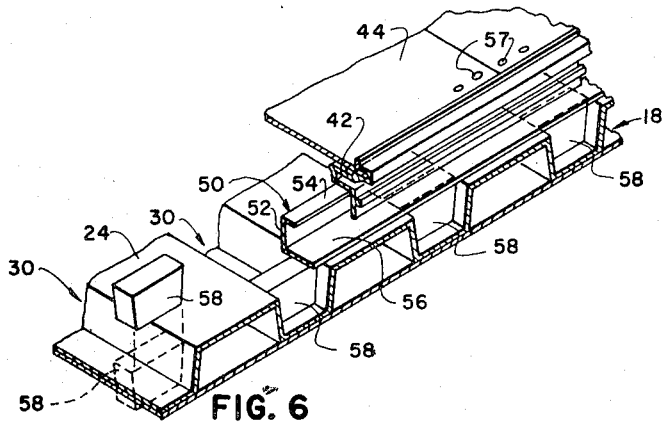
INVENTOR.
FRANK W. FORK
BY
George E. Manias
AGENT

PATENTED MAR 20 1973 3,721,051

INVENTOR.
FRANK W. FORK
BY
George E. Manias
AGENT

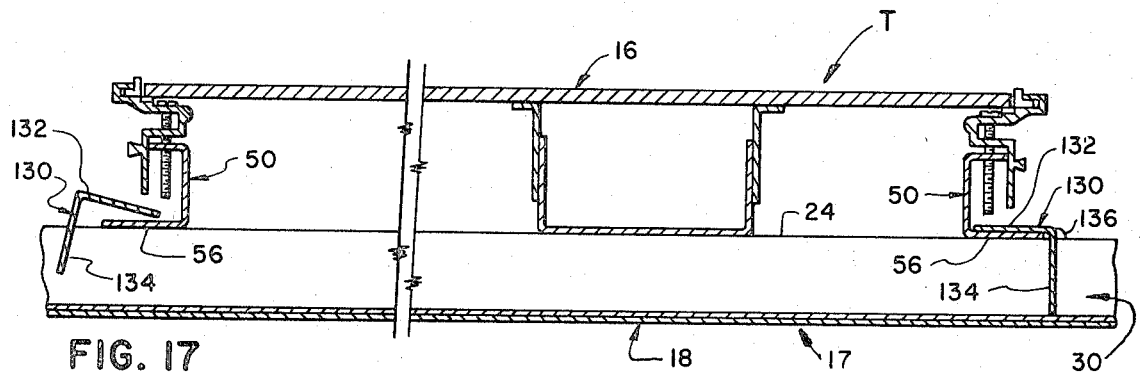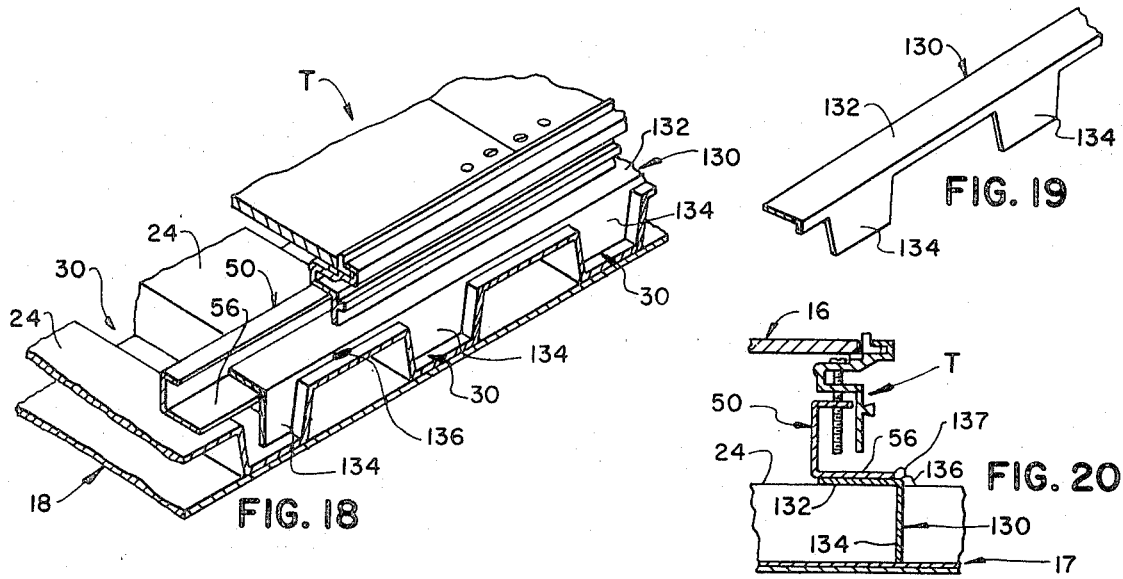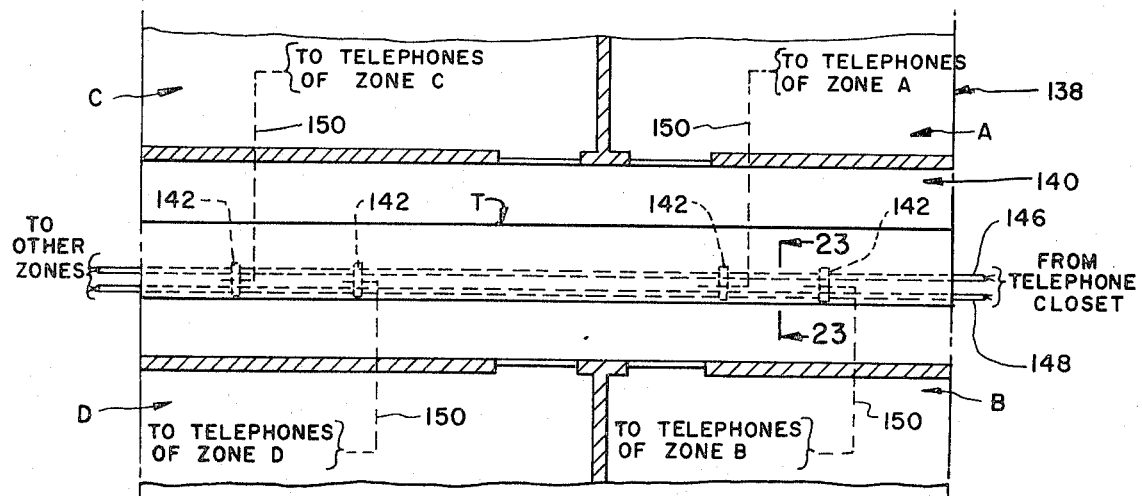

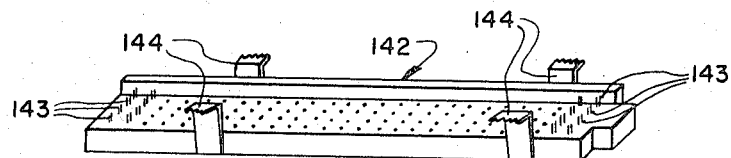
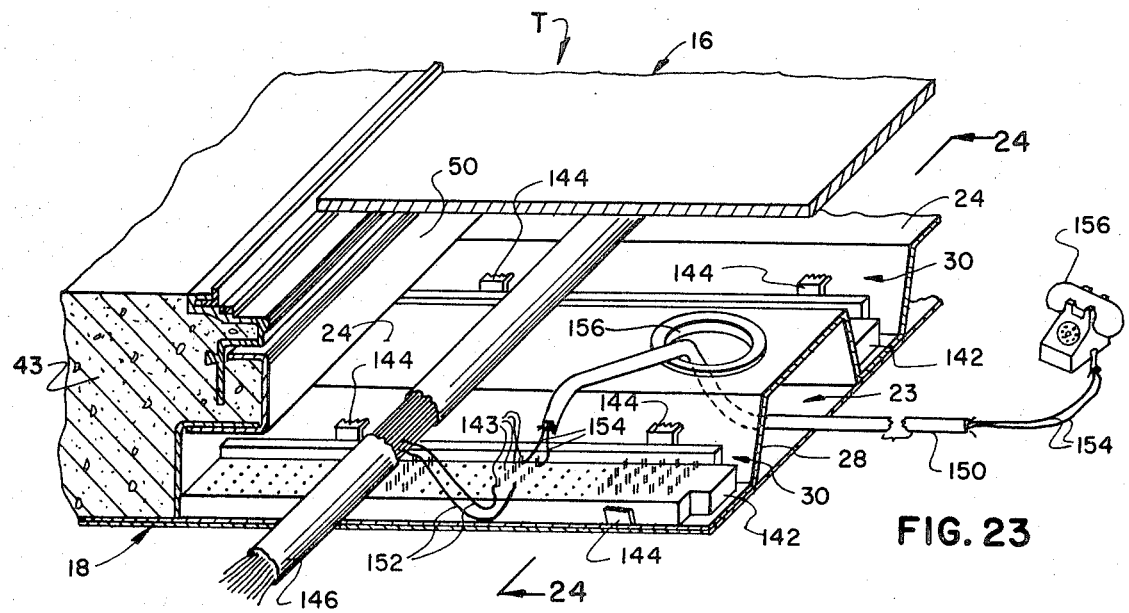
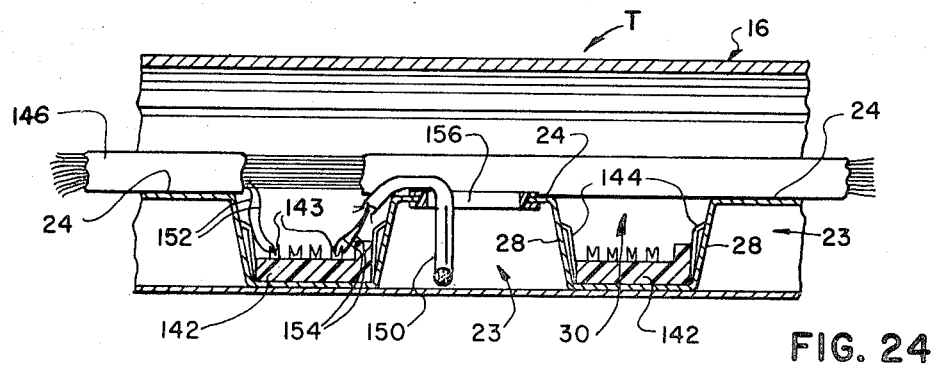

BOTTOMLESS SUB-ASSEMBLY FOR PRODUCING AN UNDERFLOOR ELECTRICAL CABLE TRENCH

CROSS-REFERENCES TO RELATED APPLICATIONS

This application is a continuation-in-part of copending application Ser. No. 71,494 filed Sept. 11, 1970 and now abandoned.

BACKGROUND OF THE INVENTION

1. Field of the Invention

This invention relates to structures known as electrical cable trenches, and more particularly to a bottomless sub-assembly which can be utilized in combination with metal cellular flooring to produce an underfloor electrical cable trench.

2. Description of the Prior Art

The use of underfloor electrical cable trenches in combination with metal cellular flooring in modern buildings has become standard construction. See U.S. Pats. No. 3,074,208 (H. SEIDEL, Jan. 22, 1963); No. 3,084,480 (F. W. FORK, Apr. 9, 1963); No. 3,101,097 (T. W. MURRAY, Aug. 20, 1963); No. 3,237,356 (F. W. FORK, Mar. 1, 1966); No. 3,262,238 (F. W. FORK, July 26, 1966); No. 3,368,311 (F. W. FORK, Feb. 13, 1968). See also Canada Pat. No. 659,866 (F. W. FORK, Mar. 19, 1963).

Such prior art electrical cable trenches utilize a U-shaped base pan having a horizontal web and upright sides. A vertically adjustable side rail is provided above each of the upright sides. A cover plate is positioned above the U-shaped base pan and spans the distance between the vertically adjustable side rails. These trenches are provided in a variety of different widths — the trench width usually corresponding to the width of the cover plate. For each trench width, a corresponding size base pan is required. In the prior art, electrical cable trenches of each established width require suitable width cover plates and corresponding width base pans.

In the prior art electrical cable trenches, the horizontal web of the base pan overlies the crests of the metal cellular flooring. Access between the interior of the trench and the interior of a particular subjacent cell is accomplished in the prior art by providing two openings, that is, a first opening in the horizontal web of the base pan and a corresponding second opening in the crest of the subjacent cell. Base pans with factory-punched openings have been used commercially. However, factory-punched openings may not coincide with the crests of previously installed metal cellular flooring. The first and second openings may be cut on the job site. In this instance the workmen must drill through two sheet metal thicknesses — such a drilling operation being time consuming. Moreover, since the crests are hidden from view by the base pan, the workmen is hindered in properly locating the drill holes with respect to the crest.

SUMMARY OF THE INVENTION

The principal object of this invention is to provide a sub-assembly which may be installed over metal cellular flooring to produce an underfloor electrical cable trench.

Another object of this invention is to utilize that upper surface portion of the metal cellular flooring enclosed by the present sub-assembly, as the bottom of the resulting underfloor electrical cable trench.

Still another object of this invention is to produce an underfloor electrical cable trench wherein removal of a cover exposes the upper surface portion of the metal cellular flooring.

A further object of this invention is to provide a sub-assembly whose width is determined solely by the width of the cover plate — the remaining components of the sub-assembly being standard regardless of the width of the cover plate.

Another object of this invention is to provide an electrical distribution system wherein access to the wiring cells of the metal cellular flooring requires cutting only a single sheet of metal (the crest of the metal cellular flooring) and consequently requires grommetting only a single sheet of metal.

Still another object of this invention is to provide vertically adjustable conduit means disposed between the cover plate and the metal cellular flooring, which serves as a separate raceway and which divides the interior of the trench into two or more additional passageways.

A further object of this invention is to provide a unique arrangement which facilitates interconnections between the equipment of telecommunication systems, such as, telephones, computers, internal communication and auxiliary signal apparatus and the like.

As in prior art trenches, the present sub-assembly incorporates vertically adjustable side rails and a cover plate which is positioned above the side rails and which spans the distance therebetween. Numerous other prior art components, such as reversible tile stops, temporary cover plate fasteners, leveling screws, spring clips for detachably connecting the cover plate to the side rails, and the like, also may be incorporated in the present sub-assembly.

The present invention provides a sub-assembly which, contrary to the prior art, does not employ a base pan. Instead, in accordance with the present invention, two separate sub-rails are provided, one disposed beneath each of the side rails. The overall arrangement is such that the present sub-assembly is bottomless. When the present sub-assembly is installed over metal cellular flooring, an underfloor electrical cable trench is produced wherein that portion of the corrugated upper surface of the flooring in the region between the sub-rails constitutes the bottom of the thus produced cable trench. When the cover plate is removed, the corrugated upper surface of the flooring is exposed to view.

Further in accordance with the present invention, closure means are provided in the corrugations or troughs of the metal cellular flooring, beneath each of the sub-rails. The closure means prevents ingress of a subsequently poured layer of concrete into the interior of the thus formed cable trench.

Still further in accordance with the present invention, unique conduit means disposed between the cover plate and the metal cellular flooring, provides a separate enclosed passageway. In addition, the conduit means divides the trench interior into at least two separate trench passageways. The several passageways are adapted to segregate the wiring of different electrical services, such as, telephone, auxiliary signal or internal communications, high voltage power, and the like.

Further in accordance with the present invention, at least one multi-contact connector strip unit is provided within the present trench, for each zone of a building floor. The connector strip unit is positioned in a trough of the cellular floor, beneath the level of the crest and beneath that trench passageway through which the multi-conductor main cable extends. Placement of the connector strip unit within the electrical cable trench provides a unique arrangement which facilitates connections between, for example, the plurality of telephones of a given building zone, and a multi-conductor main telephone cable run. Placement of the telephone connector strip units within the electrical cable trench, also permits a reduction in the size of the telephone closet required to house telephone equipment; permits a reduction in the number of multi-conductor main telephone cable runs within the cable trench and consequently permits a reduction in the size of the electrical cable trench; facilitates tracing telephone line interruptions in a given floor area; and facilitates installation of new telephone circuits.

BRIEF DESCRIPTION OF THE DRAWINGS

FIG. 1 is a fragmentary plan view of the present electrical cable trench installed over metal cellular units;

FIGS. 2-4 are end views illustrating the profile of typical metal cellular units;

FIG. 5 is a cross-sectional view taken along the line 5—5 of FIG. 1;

FIG. 6 is a fragmentary isometric view of one side of the trench of FIG. 5, further illustrating closure means provided in the troughs of the metal cellular units;

FIG. 17 is a broken, cross-sectional view, similar to FIG. 5, of the present trench, illustrating alternative closure means;

FIG. 18 is a fragmentary isometric view of one side of the trench of FIG. 17, further illustrating the closure means thereof;

FIG. 19 is a fragmentary isometric view of the closure means incorporated in the trench of FIGS. 17 and 18;

FIG. 20 is a fragmentary cross-sectional view of one side of the present trench, illustrating an alternative position of the closure means of FIG. 19;

FIG. 21 is a fragmentary plan view of a building, illustrating the manner of distributing telephone connecting lines to different zones of the building;

FIG. 22 is an isometric view illustrating a multi-contact telephone connector strip unit;

FIG. 23 is a fragmentary, cross-sectional, isometric view, as viewed from the line 23—23 of FIG. 21, illustrating the position of a telephone connector strip unit; and FIG. 24 is a cross-sectional view taken along the line 24—24 of FIG. 23.

DESCRIPTION OF THE PREFERRED EMBODIMENT(S)

Figure 7:
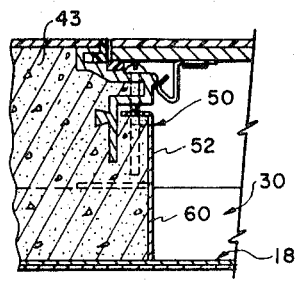
FIG. 7 is a fragmentary cross-sectional view of one side of the present trench, illustrating an alternative embodiment of the closure means.

FIG. 1 illustrates a sub-assembly 16 of this invention, installed over a subfloor 17 assembled from plural metal cellular units 18. The metal cellular units 18 (FIG. 2) may comprise a corrugated upper metal sheet 20 and a correlative lower metal sheet, such as a flat metal sheet 22, secured to the corrugated upper metal sheet 20 along contiguous portions thereof. The upper and lower metal sheets 20, 22 cooperate to provide generally parallel enclosed cells 23. The upper metal sheet 20 presents alternating coplanar crests 24 and coplanar valleys 26. Generally vertical webs 28 connect adjacent one of the crests 24 and valleys 26. The valleys 26 and the adjoining generally vertical webs 28 define generally parallel troughs 30. Marginal connecting means, such as a male lip 32 and a female lip 34 may be provided along the opposite longitudinal sides of the unit 18 whereby a plurality of the units 18 may be assembled in side-by-side interlocked relation.

Alternatively, a metal cellular unit 36 (FIG. 3) may be employed having a corrugated upper metal sheet 37 and wherein the lower metal sheet comprises a corrugated metal sheet 38.

Alternatively, a metal cellular unit 40 (FIG. 4) may be employed wherein the lower metal sheet comprises at least one narrow flat metal sheet 41 secured to the upper corrugated metal sheet 37. The metal cellular unit 40 provides one or more of the enclosed cells 23 depending on the width and number of flat lower metal sheets 41 employed. The metal cellular units 18, 36 and 40 are typical of the many flooring units which may be employed in concrete floor constructions.

Referring to FIG. 5, the present sub-assembly 16 includes, in part, a pair of vertically adjustable side rails 42, each independently anchored in a layer of concrete 43 in fixed spaced-apart relationship; a cover plate 44 which spans the distance between the side rails 42 and which is essentially flush with the upper surface of the layer of concrete 43; fastener means 46 for detachably connecting the cover plate 44 to the side rails 42; and leveling screws 48 for vertically adjusting the position of the side rails 42 relative to the metal cellular unit 18.

PRESENT IMPROVEMENT: In accordance with the present invention, the sub-assembly 16 includes sub-rails 50 (FIGS 5, 6), one positioned beneath each of the side rails 42. Each of the sub-rails 50 may include a vertical web 52 connecting outwardly extending, upper and lower horizontal flanges 54, 56. The leveling screws 48 are threadedly engaged with the upper horizontal flange 54. The lower horizontal flange 56 overlies the crests 24 of the metal cellular unit 18.

Further in accordance with the present invention, that upper surface portion indicated by the dimension line 53 (FIGS. 1 and 5) of the metal cellular units 18, in the region between the sub-rails 50 constitutes the bottom of the sub-assembly 16 and cooperates with the sub-assembly 16 to form the underfloor electrical cable trench T. Note that the crests 24 of the upper surface portion 53 confront the cover plate 44 and thus are exposed to view when the cover plate 44 is removed.

It is to be understood that the sub-assembly 16 cannot properly be described as a trench since the sub-assembly 16 has no bottom. Only when the sub-assembly 16 is combined with the subfloor 17 is an underfloor electrical cable trench created.

It will be observed in FIG. 5 that the leveling screws 48 connect the side rails 42 to the sub-rails 50. Moreover, temporary fastening screws 57 (FIG. 6) are provided for temporarily connecting the cover plate 44, to each of the side rails 42. Accordingly, the cover plate 44, the side rails 42 and the subrails 50 constitute a unitary structure — sub-assembly 16 — prior to being installed over the metal cellular units 18.

It is a convenient concept when describing the sub-assembly 16 to state that the sub-assembly 16 includes opposite sides 47a, 47b, each independently anchored in the concrete 43 in fixed spaced-apart relationship; and the cover plate 44 spanning the distance between the opposite sides 47a, 47b. It will be appreciated that each of the opposite sides 47a, 47b consists of one of the side rails 42, one of the sub-rails 50 and the connecting leveling screws 57.

The sub-assembly 16 has a width W corresponding to the width of cover plate 44. Since the sub-rails 50 constitute separate elements, the overall width W of the present sub-assembly 16 is determined solely by the width of the cover plate 44 — the side rails 42 and the sub-rails 50 being standard regardless of the width of the sub-assembly 16. The present sub-assembly 16 and the subsequently formed trench T, may be provided in any desired width, merely and solely by providing a cover plate 44 of the desired width.

In this embodiment, the sub-assembly 16 is disposed essentially entirely above the plane of the crests 24. Closure means, such as plugs 58 disposed beneath each of the sub-rails 50, essentially entirely fill each of the troughs 30 thereby preventing ingress of the concrete 43 into the interior of the trench 16. The plugs 58 may be formed from metal, rubber, plastics or other suitable material.

Figure 8:
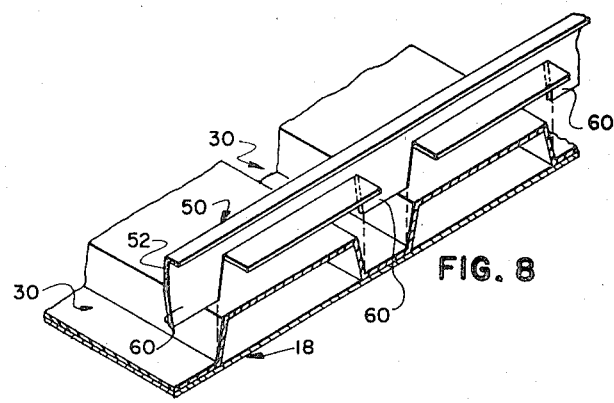
FIG. 8 is a fragmentary isometric view further illustrating the closure means of FIG. 7.

Alternatively, the closure means may, instead, comprise web segments 60 (FIGS. 7, 8) extending downwardly from the vertical web 52 of the sub-rails 50. The web segments 60 have a configuration corresponding to the transverse profile of the troughs 30.

Figure 9:
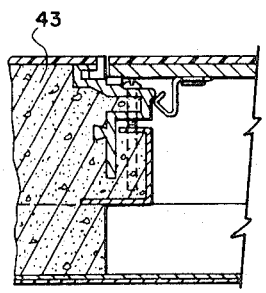
FIGS. 9 and 10 are fragmentary cross-sectional views, similar to FIG. 7, illustrating further alternative arrangements.

As illustrated in FIG. 5, the plugs 58 may remain in place during the life time of the cable trench 16. Alternatively, after the concrete 43 has hardened, the plugs 58 may be removed, see FIG. 9.

Figure 10:
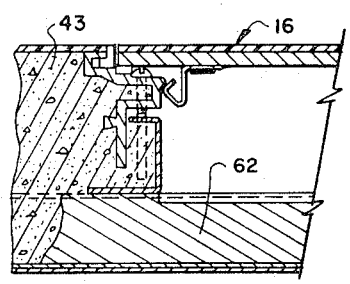

As a further alternative arrangement, the closure means may comprise a plug 62 (FIG. 10) of concrete or other suitable material, which extends along the troughs 30 for a distance greater than the width W (FIG. 2) of the trench 16. The plug 62 serves to prevent ingress of wet concrete into the interior of the trench 16.

As a further alternative arrangement, the closure means may comprise two angle-like members 130 (FIG. 17), one positioned along each of the opposite longitudinal sides of the present trench 16. As shown in FIG. 19, the angle-like member 130 includes a horizontal flange 132 and a plurality of spaced-apart, vertically presented web segments 134. It will be observed in FIG. 17 that when the angle-like members 130 are installed, the horizontal flange 132 overlies the lower flange 56 of the sub-rail 15. The web segments 134 — having a configuration corresponding to the transverse profile of the troughs 30 — essentially entirely close off the troughs 30 thereby preventing ingress of the concrete 43 (FIG. 5) into the interior of the trench 16. Each of the angle-like members 130 may be secured to the metal subfloor 17 by spot welds 136.

A particular advantage of the arrangement illustrated in FIGS. 17 to 19 is that the angle-like members 130 are "after-set" elements. That is, the trench 16 is positioned on the metal subfloor 17. Thereafter, the angle-like members 130 are installed, in the manner illustrated in FIG. 17. Securement of the angle-like members 130 to the metal subfloor 17 also secures the trench 16 to the subfloor 17 and prevents movement of the trench 16 during pouring of the concrete 43 (FIG. 5).

FIG. 20 illustrates an alternative arrangement wherein the angle-like member 130 is applied directly to the metal subfloor 17 such that the horizontal flange 132 thereof overlies the crests 24. The angle-like member 130 is secured to the metal subfloor by spot welds 136. Thereafter, the sub-assembly 16 is then installed with the lower flanges 56 of the sub-rails 50 overlying the horizontal flanges 132. Spot welds 137 secure the sub-assembly 16 to the metal subfloor 17. It will be appreciated that in this arrangement, the angle-like members are "pre-set" elements. That is, two of the angle-like members 130 are secured in fixed spaced-apart relationship prior to installing the sub-assembly 16.

Figure 11:
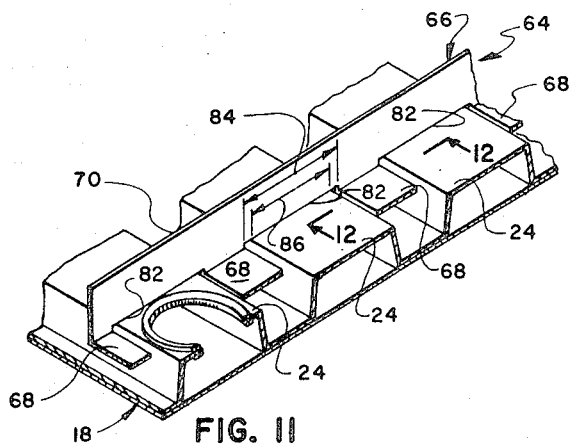
FIG. 11 is a fragmentary isometric view illustrating vertically adjustable conduit means.
Figure 12:
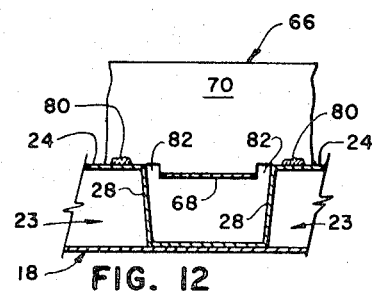
FIG. 12 is a cross-sectional view taken along the line 12—12 of FIG. 11.
Figure 13:
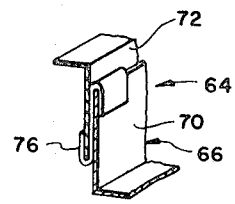
FIG. 13 is a fragmentary isometric view illustrating clip means for temporarily connecting a side plate to a channel of the conduit means of FIG. 11.

Referring to FIGS. 5, 11-14, the present invention also provides vertically adjustable conduit means in the form of a supplementary raceway 64 comprising, in general, opposed sides S, a bottom wall B and an open top O. The raceway 64 comprises a generally U-shaped channel 66 including transverse strips 68 (FIGS. 11 and 14) adjoining upstanding side walls 70; and spaced-apart side plates 72, each disposed adjacent to one of the side walls 70 and including a support flange 74 at its upper end. Prior to installing the raceway 64, the side plates 72 are connected to the side walls 70 by temporary means, such as a clip 76 (FIG. 13). After the raceway 64 is installed, the support flanges 74 are engaged with the cover plate 44 and the side plates 72 are secured to the side walls 70, for example, by welds 78 (FIG. 5). The channel 66 is secured to the crests 24, for example, by welds 80 (FIG. 12). The thus secured side plates 72 provide structural support, at mid-span, for the cover plate 44. The channel 66 and the side plates 72 may be formed from light gauge metal sheets and in convenient lengths, for example, 10 to 20 feet.

Figure 14:
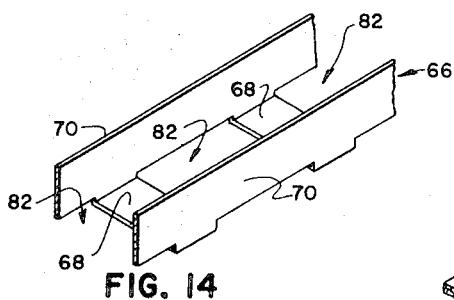
FIG. 14 is a fragmentary isometric view illustrating a generally U-shaped channel of the conduit means of FIG. 11.

Referring to FIGS. 11, 12 and 14, the transverse strips 68 provide longitudinally spaced-apart openings 82 exposing the crests 24 of the metal cellular unit 18. When the cover plate 44 is removed, the interior of the raceway 64 is exposed to view thus providing access to the crests 24 presented at the openings 82.

Each of the transverse strips 68 is positioned in the region of one of the troughs 30. It will be observed in FIG. 12, that the transverse strips 68 are positioned below the level of the coplanar crests 24. With this arrangement, wires passing over the crests 24 will not come into contact with the edges of the transverse strips 68.

It will be observed in FIG. 11 that the longitudinal width 84 of the opening 82 is greater than the transverse width 86 of the crest 24. Thus the channel 66 may be moved longitudinally to accommodate dimensional variations in the transverse width 86 and the distance between the crests 24.

Figure 15:
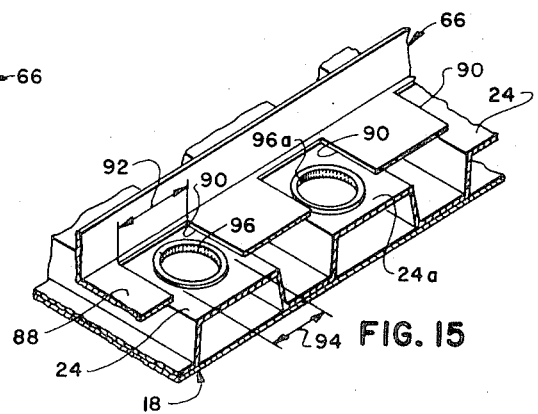
FIG. 15 is a fragmentary isometric view, similar to FIG. 11, illustrating an alternative embodiment of the conduit means.

FIG. 15 illustrates an alternative embodiment of the supplementary raceway 64. In this embodiment, the channel 66 includes transverse strips 88 which span the distance between adjacent ones of the crests 24 of the metal cellular unit 18. Longitudinally spaced-apart openings 90 defined by adjacent strips 88, have a longitudinal width 92 which is greater than the transverse width 94 of a grommetted opening 96. Thus, the channel 66 may be moved longitudinally to accommodate variations in the spacing, for example, between the grommetted opening 96 and a second grommetted opening 96a provided in the crest 24a.

Returning now to FIG. 1, the vertically adjustable conduit means 64 provides a central passageway 98 and, in addition, divides the interior of the trench 16 into lateral passageways 100, 102. A power conductor 104 extends through the central passageway 98, downwardly through a grommetted opening 106, into a cell 108, and is connected to a motor schematically illustrated at 110. Auxiliary wiring 112 extends through the lateral passageway 100, through a grommetted opening 114, into a cell 116, and is connected to an alarm schematically illustrated at 118. A telephone cable 120 extends through the opposite lateral passageway 102, through a third grommetted opening 122, into a cell 124, and is connected to a telephone schematically illustrated at 126.

In the arrangement illustrated in FIG. 1, the vertically adjustable conduit means 64 serves to segregate the high voltage power conductor 104 from the low voltage auxiliary and telephone wiring 112, 120. Moreover, the auxiliary and telephone wiring 112, 120 are themselves essentially segregated.

Figure 16:
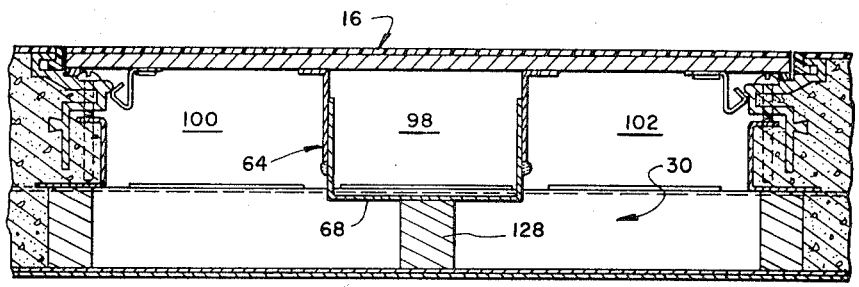
FIG. 16 is a cross-sectional view, similar to FIG. 5, illustrating a further alternative arrangement.

An alternative arrangement of the present sub-assembly 16 is illustrated in FIG. 16. In this arrangement, closure members or plugs 128 (only one visible) are provided in the troughs 30 beneath the bottom wall 68. The plugs 128 serve to completely segregate the lateral passageways 100, 102. In this arrangement, any one of the passageways 98, 100, 102 may contain power conductors whereas each of the remaining two passageways may contain either telephone or auxiliary wiring.

The fire resistance of the floor structure in the region of the cable trench T may be improved by the addition of a heat transfer barrier. For example, the troughs 30 (FIG. 6) directly beneath the trench T may be filled with blocks of gypsum or other suitable heat resistant material. Alternatively, a fire resistant coating, such as gypsum, intumescent paint and the like, may be applied to the upper surface portion 53 (FIGS. 1 and 5).

FIG. 21 illustrates a fragment of one floor of a building 138, which includes a corridor 140 in which the present cable trench T is presented. The floor area of the building 138 may be divided into a plurality of zones, for example, the zones A, B, C, D . . . etc. Each zone has a telephone service requirement which may vary according to the number of personnel occupying each zone.

In accordance with past and present practice, each floor is provided with one or more telephone closets for housing the various telephone equipment. Such equipment includes the telephone connector strip unit 142 (FIG. 22) which presents a plurality of contacts 143. One or more of the strip units 142 are used to provide circuit connections between the main incoming telephone lines and the telephones of a particular zone. Since all connections are made in the telephone closet, a relatively large number of multi-conductor main telephone cable runs are required, all of which extend through the trench T. As a result of this arrangement, relatively large telephone closets are necessary. Moreover, a cable trench having a relatively large cross-sectional area is required to house the large number of main telephone cable runs. Also, tracing of telephone line interruptions in a given floor area as well as installation of new telephone circuits are time consuming operations.

In accordance with the present invention and as shown in FIGS. 21, 23 and 24, one or more of the telephone connector strip units 142 are placed within the cable trench T for servicing the telephones of each of the zones A to D. In particular, each of the telephone connector strip units 142 is positioned within a trough 130 of the metal cellular flooring 18, beneath the level of the crests 24. The connector strip unit 142 may be retained in place by any suitable means, such as spring arms 144 which frictionally engage the opposed webs 28.

Referring to FIG. 21, a typical installation may include, for example, two multi-conductor main telephone cable runs 146, 148 which extend from the telephone closet (not illustrated) through substantially the entire length of the cable trench T. At least one connector strip unit 142 is installed within the cable trench T at spaced-apart locations therein, for each of the zones A to D. One or more multi-conductor connecting cables 150 extend from each of the connector strip units 142 to the telephones of the zone being serviced.

It will be observed in FIG. 23 that, for example, a pair of conductors 152 of the main cable run 146 is connected to appropriate ones of the contacts 143 of the connector strip unit 142. A pair of conductors 154 of the connecting cable 150 also is connected to appropriate ones of the contacts 143 of the connector strip unit 142. The connecting cable 150 extends from the connector strip unit 142, through a grommetted opening 156 in the crest 24 and the enclosed cell 23. The conductors 154 are ultimately connected to a telephone, schematically illustrated at 156, which is located at a remote location in zone A, for example.

It will be appreciated that placement of the telephone connector strip units 142 within the electrical cable trench provides several distinct advantages. For example, removal of the multitude of telephone connector strip units from the telephone closet permits the size of the telephone closet to be reduced. Inasmuch as all connections can be made within the electrical cable trench, the number of multi-conductor main telephone cable runs may be reduced. A reduction in the number of multi-conductor main telephone cable runs also permits a reduction in the size of the electrical cable trench. The close proximity of the telephone connector strip units to the zone being serviced, will facilitate installation of new telephone circuits and may facilitate tracing telephone line interruptions within that zone.

It will be appreciated that the connector strip units 142 positioned within the present trench T may also be employed to provide circuit connections for other telecommunications systems, such as computers, internal communications, auxiliary signals and the like.

I claim:

1. In an electrical wiring distributing floor structure including a metal subfloor and an overlying layer of concrete; said metal subfloor presenting alternating crests and troughs, and including metal cellular units providing generally parallel enclosed cells; the improvement comprising:
   a sub-assembly including
      opposite sides, each independently anchored in said concrete in fixed spaced-apart relationship; and
      a cover plate spanning the distance between said opposite sides;
   said sub-assembly extending transversely across said crests of said metal subfloor and being bottomless, whereby that upper surface portion of said metal subfloor in the region between said opposite sides, cooperates with said sub-assembly to create an underfloor electrical cable trench;
   said upper surface portion confronting said cover plate and being exposed to view when said cover plate is removed.

2. The improvement defined in claim 1 wherein said layer of concrete extends inwardly beneath said opposite sides and fills said troughs.

3. The improvement defined in claim 1 including a fire resistant material filling those portions of said troughs residing beneath and between said opposite sides.

4. The improvement defined in claim 1 including closure means disposed adjacent to each of said opposite sides for filling said troughs thereby to prevent ingress of said concrete into the interior of the formed cable trench.

5. The improvement defined in claim 4 wherein said closure means comprises plugs having a configuration corresponding to the transverse profile of said troughs and having upper edges engaging said opposite sides.

6. The improvement defined in claim 4 wherein said closure means comprises segments of said opposite sides extending downwardly into said troughs and essentially entirely closing said troughs.

7. The improvement defined in claim 4 wherein said closure means comprises separate members, one extending along each said opposite sides and presenting generally vertical segments extending into and essentially entirely closing said troughs.

8. The improvement defined in claim 1 wherein each of said opposite sides comprises
   a side rail supporting one edge of said cover plate, and
   a sub-rail positioned between said side rail and said crests of said metal subfloor.

9. The improvement defined in claim 1 including:
   an enclosed raceway extending downwardly from said cover plate between said side rails, said enclosed raceway including a bottom wall provided with longitudinally spaced openings exposing said crests.

10. The improvement defined in claim 9 wherein said bottom wall comprises longitudinally spaced transverse strips each positioned in the region of one of said troughs.

11. The improvement defined in claim 10 wherein said transverse strips are positioned below the level of said crests.

12. The improvement defined in claim 9 wherein said bottom wall comprises longitudinally spaced transverse strips each spanning the distance between adjacent ones of said crests.

13. The improvement defined in claim 9 wherein said enclosed raceway comprises:
   a generally U-shaped channel including upstanding side walls adjoining said bottom wall; and
   spaced-apart side plates, each extending downwardly from said cover plate and disposed adjacent to one of said upstanding side walls.

14. The improvement defined in claim 9 wherein said raceway has an open top which is closed by said cover plate, said openings being exposed to view when said cover plate is removed.

15. The improvement defined in claim 1 including
   a multi-contact cable connector strip unit positioned in one of said troughs within said sub-assembly.

16. The improvement defined in claim 15 wherein said connector strip unit resides below the level of said crests.

* * * * *